United States Patent

[11] 3,575,367

| [72] | Inventors | Robert Louis Welsh;<br>William Russell Bodine, Cherry Hill, N.J. |
|---|---|---|
| [21] | Appl. No. | 772,519 |
| [22] | Filed | Nov. 1, 1968 |
| [45] | Patented | Apr. 20, 1971 |
| [73] | Assignee | Omark Industries, Inc.<br>Portland, Oreg. |

[54] STANDOFF HANGER ASSEMBLY
7 Claims, 10 Drawing Figs.
[52] U.S. Cl............................................... 248/59,
24/73.7, 248/62
[51] Int. Cl............................................. F16l 3/10
[50] Field of Search............................................. 248/70, 62,
59, 65, 220.5, 327, 323, 343; 287/124, 117

[56] References Cited
UNITED STATES PATENTS

| 502,150 | 7/1893 | Trepus .......................... | 248/59 |
| 948,902 | 2/1910 | Noyes............................ | 248/62 |
| 1,514,455 | 11/1924 | Gordon ........................ | 248/62X |
| 2,161,782 | 6/1939 | Flower ......................... | 248/59 |
| 2,977,405 | 3/1961 | Warnock...................... | 248/70X |
| 3,173,639 | 3/1965 | Dunn............................ | 248/65 |
| 3,284,037 | 11/1966 | Muller.......................... | 248/62 |
| 3,363,920 | 1/1968 | Kasparian..................... | 287/125X |

*Primary Examiner*—Chancellor E. Harris
*Attorney*—Charles F. Duffield

ABSTRACT: A tubular standoff hanger assembly which may be installed by means of the stud welding technique. A large cross section standoff member, which provides inherent rigidity due to its large diameter, is secured to a supporting surface by means of a stud which is welded to the supporting member wherein the stud includes a flange on one end thereof complementary with the inside configuration of the tubular standoff. Mating threads and wedging means are provided to lock the flange of the stud with the standoff to maintain the standoff in engagement with the supporting surface. An adjustable hanger bracket for pipe or the like is provided on the opposite end of the standoff and includes a resilient rubber block and flexible banding in one embodiment and a stirrup-and-yoke combination in another embodiment.

Patented April 20, 1971

INVENTORS.
Robert L. Welsh
William R. Bodine
BY Charles F Duffield
ATTORNEY.

Patented April 20, 1971

INVENTORS.
Robert L. Welsh
William R. Bodine
BY Charles F. Duffield
ATTORNEY.

STANDOFF HANGER ASSEMBLY

SUMMARY AND OBJECTS OF INVENTION

The present invention applies to standoff hanger assemblies and, more specifically, to an adjustable standoff hanger which may be secured by the stud welding technique.

A standoff hanger assembly must have sufficient rigidity to adequately support the apparatus or equipment being carried by the assembly. The hanger assembly must also be of the type which can be quickly and economically assembled even though the object which is to be supported is already in place. For example, in the shipbuilding industry, many pipes will be passed through the bulkheads of the ship and thus be substantially in place before the hanger assemblies are secured to the pipes. One of the requirements of this industry is that such pipes cannot be moved while the hanger assemblies are being secured to the pipes.

The standoff hanger assemblies which are presently being employed, in such applications, utilize a large diameter tubular pipe. The pipe must be cut off to the exact length necessary for each location at which the pipe is to be supported. The tubular pipe is then handwelded in position above the pipe to be supported.

The large diameter pipe, when handwelded in position, does provide a reasonably rigid standoff. However, the necessity of cutting the pipe to the exact length and the handwelding of the pipe are both time consuming and expensive.

Use of the modern stud welding technique has been considered in applications such as the above. Nevertheless, there is a practical limitation, at present, on the maximum diameter of stud which can be welded. These maximum diameters are not yet sufficiently large to provide the necessary rigidity for a standoff of the nature required.

It is, accordingly, an object of the present invention to provide a standoff hanger assembly which uses a large diameter pipe providing the requisite rigidity which is secured to the supporting surface by means of the stud welding technique.

It is a further object of the present invention to provide an adjustable hanger assembly which may be fixed in place and secured to the object to be supported after the object is itself place.

The hanger assembly of the present invention carries out stud welding foregoing objects by utilizing a flanged stud in conjunction with a large diameter hollow standoff. The stud is welded at its smaller end to the supporting surface and the standoff is inserted down over the flange and against the supporting surface. The end of the standoff in engagement with the supporting surface has an internal configuration complementary to the flange of the stud. Apparatus is provided for securing the standoff to the flange of the stud so as to draw the standoff in engagement with the supporting surface. In this manner, the advantages of a large diameter standoff are combined with the economy of the stud welding technique.

In one embodiment of the invention, the flange of the stud and the standoff are secured by mating threads. In another embodiment of the invention, the standoff and stud are secured together by means of a tapered locking pin passing through apertures in the standoff and engaging the underneath edge of the flange on the stud.

The object to be supported is secured to the opposite end of the standoff by means of flanged studs in the same manner as the standoff is secured to the supporting surface.

A pipe-supporting bracket is provided and permits the standoff to be secured to the supporting surface and adjusted to the pipe after the pipe is in place. The pipe bracket employs a yoke which is welded to the flanged stud. The bracket further includes a hinged pair of pipe stirrups which have a plurality of apertures in the upper ends thereof into which the yoke is selectively disposed to adjust the proper length of the hanger assembly.

In another embodiment of the present invention, a pipe bracket is provided which includes a mounting base welded to the flanged stud. A resilient snubbing block is placed between the mounting base and the pipe to be suspended and a flexible band is passed through an aperture in the base and around the pipe to secure the two together.

Other objects and advantages of the present invention will become apparent from the detailed description thereof taken in conjunction with the drawings.

DETAILED DESCRIPTION OF INVENTION

Figure 1:
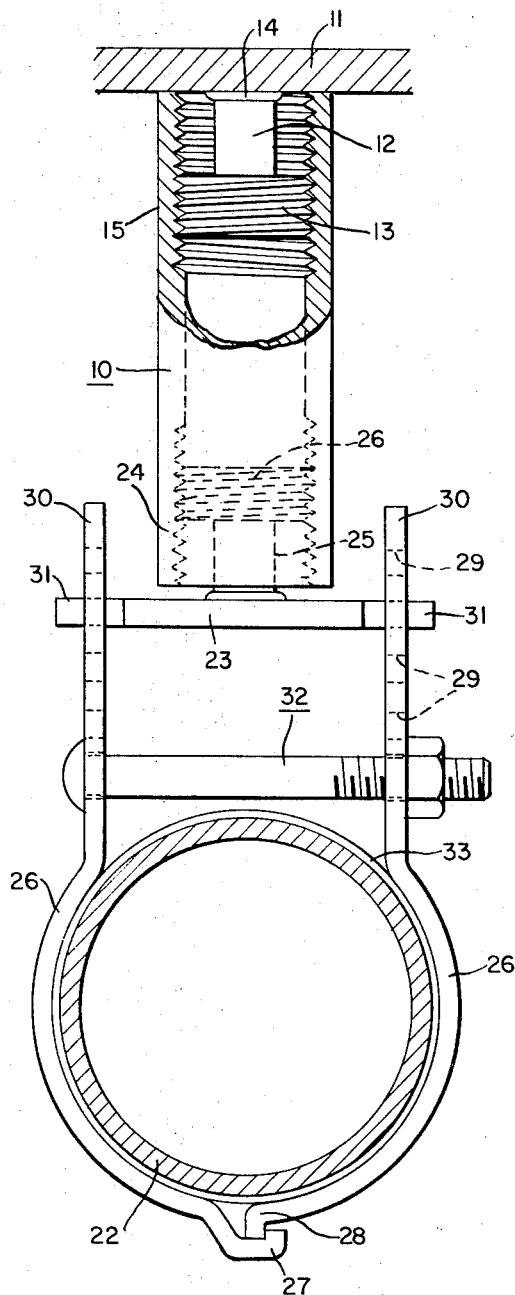
FIG. 1 is an end view of one embodiment of the hanger assembly of the present invention shown partially cut away.
Figure 2:
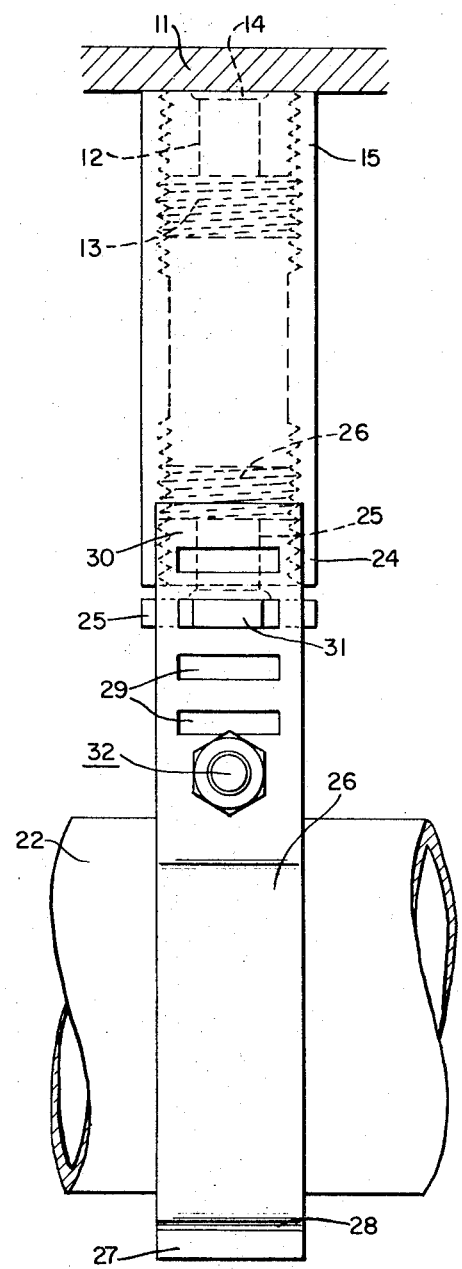
FIG. 2 is an end view of the embodiment of the hanger assembly of FIG. 1.

In FIGS. 1 and 2, one embodiment of the standoff hanger assembly of the present invention is shown. In this embodiment, a large diameter tubular standoff 10 is employed which has one end thereof in engagement with a supporting member 11 to which the hanger assembly is to be attached. Attachment of the standoff 10 is accomplished by means of a stud 12 which is stud welded to the supporting surface 11 by means of the stud welding technique.

A large diameter flange 13 is provided on one end of the stud 12. The diameter of this flange must be at least equal to, and preferably in excess of, the maximum diameter of the weld fillet 14 which results when the stud 12 is welded to the supporting surface 11.

A first end 15 of the standoff has an internal configuration complimentary with the configuration of the flange 13 of the stud. In the embodiment of FIGS. 1 and 2, the flange 13 of the stud and the internal diameter of the end 15 of the standoff are both threaded. This permits the standoff 10 to be threaded over the flange 13 and drawn into firm engagement with the supporting surface 11. Due to the large diameter of the end 15 of the standoff, the standoff will be extremely rigid.

Figure 4:
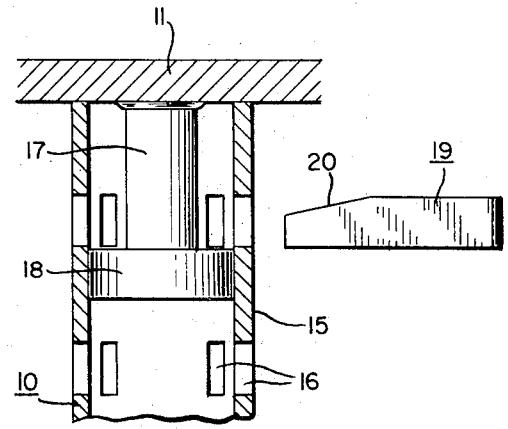
FIG. 4 is a sectional view of a second embodiment of the structure for securing the standoff to the supporting member.
Figure 6:
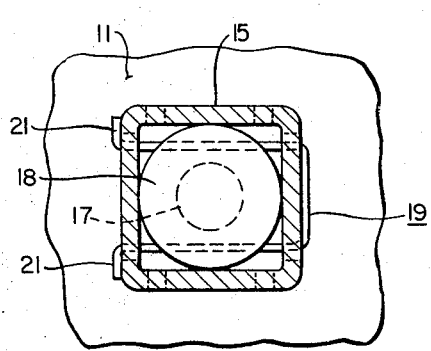
FIG. 6 is a top plan view of the embodiment of FIGS. 4 and 5 when assembled.
Figure 5:
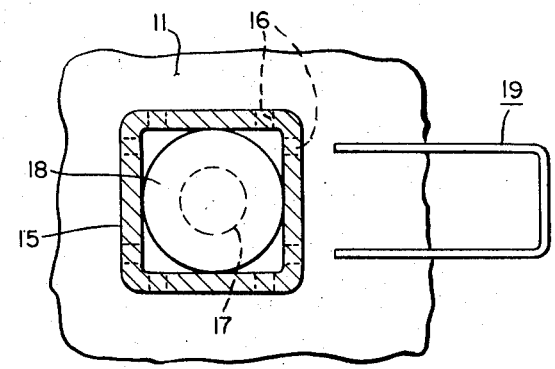
FIG. 5 is a top plan view of the embodiment of FIG. 4.

In FIGS. 4—6, there is shown another embodiment of the present invention by which the large diameter standoff may be secured to the supporting surface. In this embodiment, the standoff 10 includes a plurality of apertures 16 positioned longitudinally along the end 15 of the standoff.

A stud 17 is employed and is similar to the stud 12 in the embodiment of FIGS. 1 and 2 except that the flange 18 is not threaded. The stud 17 is stud welded to the supporting surface 11, as in the case of the embodiment of FIGS. 1 and 2, and the end 15 of the standoff passed down over the stud.

After the end 15 has been passed over the stud 17, a U-shaped locking pin 19 is inserted into the apertures 16 and underneath the flange 18 of the stud 17. The locking pin 19 includes a taper 20 thereon to aid in inserting the locking pin and, as well, to cam the standoff into firm engagement with the supporting surface 11.

As shown in FIG. 6, after the locking pin has been inserted through the apertures in the standoff 10, the ends 21 thereof are flattened to secure the pin and the assembly.

The configuration of the standoff 10 is shown as square in the embodiment of FIGS. 4—6. However, a round standoff could be employed in this embodiment. In any event, the inside configuration of the end 15 of the standoff is substantially complementary with the flange 18 of the stud 17.

The standoff of either FIGS. 1—2 or FIGS. 4—6 may be employed to support any number of objects such as light fixtures, junction boxes, electrical cables and pipes.

In the case where pipes are being supported, it is often found necessary to attach the hanger assembly to the pipe after the pipe has been placed in the position at which it is to be supported. The hanger assembly of the present invention further includes pipe brackets, used in conjunction with the standoff, which permit the standoff to be secured in place and the hanger assembly secured to the pipe even though the pipe is already in place.

One embodiment of the pipe bracket of the present invention is shown in FIGS. 1 and 2. In this embodiment, the stud 12 and standoff 10 are secured in place above the pipe 22 which is to be supported. The standoff 10 will always be short enough to pass clearly and easily over top of the pipe 22.

A yoke 23 is provided and includes a stud 25 stud welded to the central portion of the yoke. The stud 25 includes a threaded flange 26 thereon which is threaded into the opposite end 24 of the standoff 10.

After the yoke 23 is in place, a pair of stirrups 26 hinged at their ends 27 and 28 are placed around the pipe 22. Apertures 29 in the upwardly-extending ends 30 of the stirrups provide for rough adjustment of the stirrups with the tapered ends 31 of the yoke 23. Fine adjustment of the yoke 23 so as to coincide with a pair of apertures 29 is made by threading the stud 25 inwardly or outwardly in the standoff 10.

Once alignment has been obtained between the yoke 23 and the upper ends 39 of the stirrups 26, the stirrups are pulled together into engagement with the tapered ends 31 of the yoke and maintained in place by a nut and bolt assembly 32.

A liner 33 is placed around the pipe 22 to protect the pipe and bracket assembly from wear.

Figure 3:
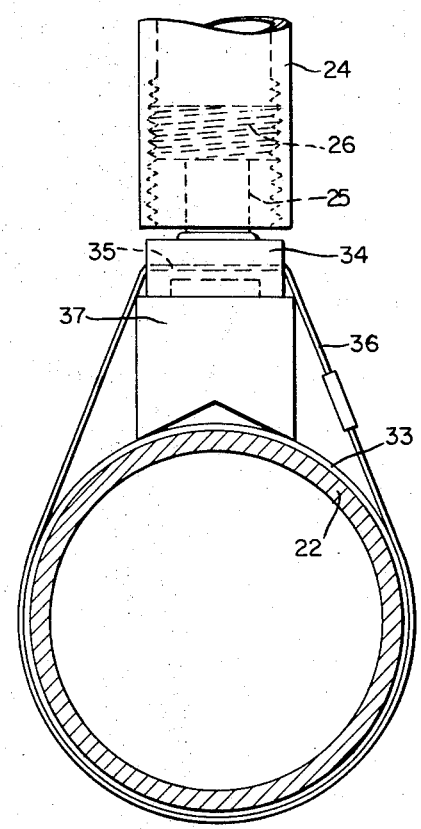
FIG. 3 is an end view of one embodiment of pipe bracket associated with the hanger assembly of the present invention.

A second embodiment of bracket assembly is shown in FIG. 3 of the drawings. In this embodiment, the opposite end 24 of the standoff is internally threaded to receive a threaded flanged stud 25 as earlier described. The opposite end of the stud 25 is stud welded to a mounting block 34. The mounting block includes an aperture 35 running transversely through the block.

A resilient rubber or plastic snubbing block 37 is utilized between the lower surface of the mounting block 34 and the upper surface of the pipe 22. Once the snubbing block 37 is in place, the mounting block 34 is threaded outwardly of the standoff until the proper adjustment has been made. A flexible metal band 36 is then passed through the aperture 35 in the mounting block and around the circumference of the pipe 22 to secure the pipe to the hanger assembly.

The arrangement for securing the standoff to the flanged stud shown in FIGS. 4—6 may be employed interchangeably with either of the embodiments of FIGS. 1, 2 or 3.

The hanger assembly of the present invention has been described in respect to the particular embodiments thereof shown in the drawings. However, it is not intended that the invention be limited to these particular embodiments but, instead, the invention is to be interpreted in view of the appended claims.

We claim:

1. A rigid tubular standoff hanger assembly adapted for installation by the stud welding technique comprising:

an elongate end weldable stud having one end thereof of configuration suitable for welding by the stud end welding technique to a metalic supporting member to which the hanger is to be attached and the opposite end thereof including a flange of diameter substantially in excess of the diameter of the extremities of the weld base fillet resulting from the stud welding process;

an elongate hollow standoff, having a first end thereof of internal configuration complementary with said flange of the stud and adapted to pass longitudinally over the stud and engage the supporting member to which the stud is welded; and securing means cooperating between said flange and said standoff for drawing and maintaining said first end of the standoff in firm engagement with the surface of the supporting member.

2. The hanger assembly of claim 1 wherein said securing means comprises mating threads on the flange of the stud and the inside of the standoff.

3. The hanger assembly of claim 1 wherein said securing means includes apertures in the wall of the standoff and a locking pin adapted to pass through said aperture and against the bottom edge of the flange of said stud.

4. The hanger assembly of claim 3 wherein the locking pin is tapered and draws the standoff against the supporting member when the pin is driven into place.

5. The hanger assembly of claim 1 further including a second stud having a first end thereof suitable for stud welding to the article to be supported and the opposite end thereof including a substantially enlarged flange portion;

wherein the opposite end of the standoff member is of configuration complementary with the flange of the second stud; and including means for securing the flange of the second stud and the standoff member one of the other.

6. The hanger assembly of claim 5 especially adapted for supporting pipe which further includes: a mounting base including a transverse aperture therein and which is stud welded to said first end of the second stud, a semiresilient snubbing block disposed between the mounting base and the pipe being supported, and a flexible unpreformed band passing through said aperture and around said pipe to secure the pipe in place.

7. The hanger assembly of claim 1 especially adapted for supporting a pipe further including;

a pipe stirrup including two hinged members adapted for clamping disposition around the pipe to be supported and terminating in two parallel upper ends each having apertures therein;

a yoke either end of which is tapered passing through and wedging in said apertures;

a second elongate stud having one end thereof stud welded to the central portion of said yoke and including a flange on the opposite end thereof;

the opposite end of said standoff being of complementary configuration with said flange of said second stud; and means cooperating with said flange of the second stud and said standoff for securing the flange and standoff rigidly one to the other.